United States Patent
Peterson

(10) Patent No.: US 6,598,095 B2
(45) Date of Patent: *Jul. 22, 2003

(54) METHOD AND SYSTEM FOR IDENTIFYING AND CONFIGURING PERIPHERAL DEVICES

(75) Inventor: Noel Peterson, Meridian, ID (US)

(73) Assignee: Micron Technology, Inc., Boise, ID (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/290,888

(22) Filed: Apr. 14, 1999

(65) Prior Publication Data

US 2002/0199039 A1 Dec. 26, 2002

(51) Int. Cl.7 .................................................. G06F 13/10
(52) U.S. Cl. ................................. 710/8; 710/10; 710/62
(58) Field of Search ................................. 710/8, 10, 62, 710/63, 64; 703/24, 25

(56) References Cited

U.S. PATENT DOCUMENTS

| 4,589,063 | A |   | 5/1986  | Shah et al.     |         |
|-----------|---|---|---------|-----------------|---------|
| 5,128,995 | A |   | 7/1992  | Arnold et al.   |         |
| 5,161,102 | A | * | 11/1992 | Griffin et al.  | 710/104 |
| 5,355,498 | A | * | 10/1994 | Provino et al.  | 709/320 |

(List continued on next page.)

OTHER PUBLICATIONS

Alex Chan—"Toshiba XM–3701B"—Mar. 25, 1996.*

Den Haan, Storage Utilities [online], Feb. 1997 [retrieved on Nov. 13, 2002]. Retrieved from the Internet: <URL:http//thef–nym.sci.kun.nl/~pieterh/tools.html>.*

(List continued on next page.)

Primary Examiner—Thomas Lee
Assistant Examiner—Thuan Du
(74) Attorney, Agent, or Firm—Perkins Coie LLP

(57) ABSTRACT

A method, programmed medium and system that determines if a computer operating without a functioning operating system contains an IDE type CD-ROM device. If it is determined that the computer contains an IDE type CD-ROM device, the user is prompted with device type, make and model identifiers and a driver common to all IDE type CD-ROM devices is loaded from a programmed medium into the computer without any user intervention. If it is determined that the computer does not contain an IDE type CD-ROM device, it is determined whether the computer contains a SCSI type controller for a SCSI type CD-ROM device. If it is determined that the computer contains a SCSI type controller and thus, a SCSI type CD-ROM device, the user is prompted with the identity of the SCSI type controller and a driver associated with the identity of the SCSI type controller is loaded from a programmed medium into the computer without any user intervention. By using a driver common to all IDE type CD-ROM devices instead of the numerous individual IDE drivers, the method of the present invention can be incorporated into a single boot disk which can be used during installation, re-installation and emergency situations.

42 Claims, 3 Drawing Sheets

U.S. PATENT DOCUMENTS

| | | | |
|---|---|---|---|
| 5,418,918 A | | 5/1995 | Vander Kamp et al. |
| 5,463,766 A | | 10/1995 | Schieve et al. |
| 5,555,401 A | * | 9/1996 | Allen et al. ............ 710/8 |
| 5,581,766 A | | 12/1996 | Spurlock |
| 5,598,563 A | | 1/1997 | Spies |
| 5,598,577 A | | 1/1997 | Overfield |
| 5,630,076 A | | 5/1997 | Saulpaugh et al. |
| 5,630,174 A | * | 5/1997 | Stone, III et al. ............ 710/63 |
| 5,655,148 A | | 8/1997 | Richman et al. |
| 5,668,992 A | | 9/1997 | Hammer et al. |
| 5,675,831 A | | 10/1997 | Caputo |
| 5,701,476 A | | 12/1997 | Fenger |
| 5,715,463 A | | 2/1998 | Merkin |
| 5,732,282 A | | 3/1998 | Provino et al. |
| 5,794,032 A | | 8/1998 | Leyda |
| 5,815,682 A | * | 9/1998 | Williams et al. ............ 703/25 |
| 5,867,730 A | * | 2/1999 | Leyda ............ 710/10 |
| 5,922,062 A | * | 7/1999 | Evoy ............ 710/129 |
| 5,951,684 A | * | 9/1999 | Jeon ............ 713/1 |
| 5,999,989 A | * | 12/1999 | Patel ............ 710/1 |
| 6,061,746 A | * | 5/2000 | Stanley et al. ............ 710/10 |
| 6,295,570 B1 | * | 9/2001 | Clemens et al. ............ 710/107 |

OTHER PUBLICATIONS

Hale Landis—"ATA Low Level I/O Driver—ATAIOREG.C".*

Mark Cavendish—"Re:CD–ROM Loading for Win 98"—May 24, 1998.*

Mike reinholz—"Odd CD Drivers on Win98 Startup Disk, Easy to Do!!"—Oct. 11, 1998.*

Robert Adamson—"HP 6020i Users Listen Up! A Little More Help If You Need It!"—Nov. 11, 1997.*

Uncle Gus—"Good Explanation of Win98 Startup Disk by Boot–it"—Mar. 24, 1999.*

"How Windows Setup Detects CD–ROM Drives (Q151550)"—May 28, 1996—Microsoft.*

U.S. patent application Ser. No. 09/272,845, Rollins, filed Mar. 19, 1999.

U.S. patent application Ser. No. 09/415,028, Fleming III, filed Oct. 7, 1999.

U.S. patent application Ser. No. 09/415,029, Fleming III, filed Oct. 7, 1999.

* cited by examiner

METHOD AND SYSTEM FOR IDENTIFYING AND CONFIGURING PERIPHERAL DEVICES

BACKGROUND OF THE INVENTION

1. Field of the Invention

The present invention relates to the field of computers and, more particularly to a method, programmed medium and system for identifying and configuring computer peripherals.

2. Description of the Related Art

The use of computers, especially personal computers (PCs) is widespread. The computing power of the PC, whether operating as a stand alone device or as part of a computer network, has increased significantly over the years. This increased computing power is attributable to the newer designs of today's computer architectures. While the newer designs have consistently increased computing power, they also increase the complexity of the programs that run the computer. That is, operating systems, such as Microsoft MSDOS® and Microsoft WINDOWS® 95, have become more complex over the years. As a result, the installation and configuration of a new computer has also increased in complexity.

Today, due to the complexity of the computer architectures and operating systems, most computers are assembled and configured by qualified technicians of the computer manufacturer, retailer or wholesaler. For example, when a customer purchases a PC from a computer manufacturer such as Micron Electronics, a technician or engineer of the manufacturer is responsible for assembling and configuring the PC to meet the customer's specifications. The assembly and configuration may include installing computer peripheral devices, such as a compact disk read-only memory (CD-ROM) drive, and the software, typically referred to as a driver, required by the PC to properly interface with and operate the peripheral device.

The configuration of the computer will also involve the installation of a hard drive, which serves as the main storage medium for the computer, and the operating system, which controls the operation of the computer. Typically, due to the increasing size of today's operating systems, they are installed and stored on the hard drive. Generally, most operating systems are installed from a CD-ROM and thus, the CD-ROM drive is typically installed before the operating system is installed.

Today, there are several types of CD-ROM drives, such as the integrated device electronics (IDE) and small computer system interface (SCSI) drives. There are also numerous manufacturers of CD-ROM drives. Often times, each manufacturer, has multiple CD-ROM models, which may have their own individual drivers, particularly when the drive type is IDE. The technician or engineer is faced with the problem of installing one of these CD-ROM drives into the computer. The technician must also insure that the computer identifies the drive type, make and model and then loads the correct driver without having a user interface, such as the interfaces displayed by operating systems like Microsoft MSDOS® and Microsoft WINDOWS® 95, at the time the drive is installed. Thus, there is a desire and need for a method that automatically, and without user intervention, identifies and configures computer peripherals such as CD-ROM drives when they are initially installed into a computer in the absence of a user interface, such as the interface provided by Microsoft MSDOS® or Microsoft WINDOWS® 95.

Moreover, once the computer is in the hands of the user, malfunctioning software or a mistake by the user could result in the failure of the operating system. The user would then be tasked with re-installing the operating system from a CD-ROM that was delivered with the computer. However, if the operating system is malfunctioning, the computer will not be operational and thus, unable to communicate with the CD-ROM drive. Thus, the user would also have to re-install the CD-ROM drive. The user would be required to insert an emergency boot disk to allow the computer to become partially operational. Once the PC is partially operational, the user would then need to identify the CD-ROM type, make and model. Once the drive type, make and model are identified, the user would need to load the driver for that device. A typical user, however, is unable to perform these tasks and thus, would need to have a professional to re-install the operating system and configure the computer. This could be very costly to the user and would also take time to have the repairs done. Also, due to the number of different CD-ROM types, makes and models, the memory of the boot disk would be wasted by including all of the drivers on the boot disk and thus, additional disks would be required for the user to load the correct device driver. This increases the user's inconvenience. Thus, there is a desire and need for method that automatically, and without user intervention, identifies and configures computer peripherals such as CD-ROM drives when they are being re-installed into a computer in the absence of a user interface, such as the interface provided by Microsoft MSDOS® or Microsoft WINDOWS® 95.

SUMMARY OF THE INVENTION

The present invention provides a method, programmed medium and system for automatically, and without user intervention, identifying and configuring computer peripherals such as CD-ROM drives when they are initially installed into a computer.

The present invention also provides a method, programmed medium and system for automatically, and without user intervention, identifying and configuring computer peripherals such as CD-ROM drives when they are being re-installed into a computer.

The above and other features and advantages of the invention are achieved by a method, programmed medium and system that determines if a computer operating without a functioning operating system contains an IDE type CD-ROM device. If it is determined that the computer contains an IDE type CD-ROM device, the user is prompted with device type, make and model identifiers and a driver common to all IDE type CD-ROM devices is loaded from a programmed medium into the computer without any user intervention. If it is determined that the computer does not contain an IDE type CD-ROM device, it is determined whether the computer contains a SCSI type controller for a SCSI type CD-ROM device. If it is determined that the computer contains a SCSI type controller and thus, a SCSI type CD-ROM device, the user is prompted with the identity of the SCSI type controller and a driver associated with the identity of the SCSI type controller is loaded from a programmed medium into the computer without any user intervention. By using a driver common to all IDE type CD-ROM devices instead of the numerous individual IDE drivers, the method of the present invention can be incorporated into a single boot disk which can be used during installation, re-installation and emergency situations.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF PREFERRED EMBODIMENTS

Figure 1:
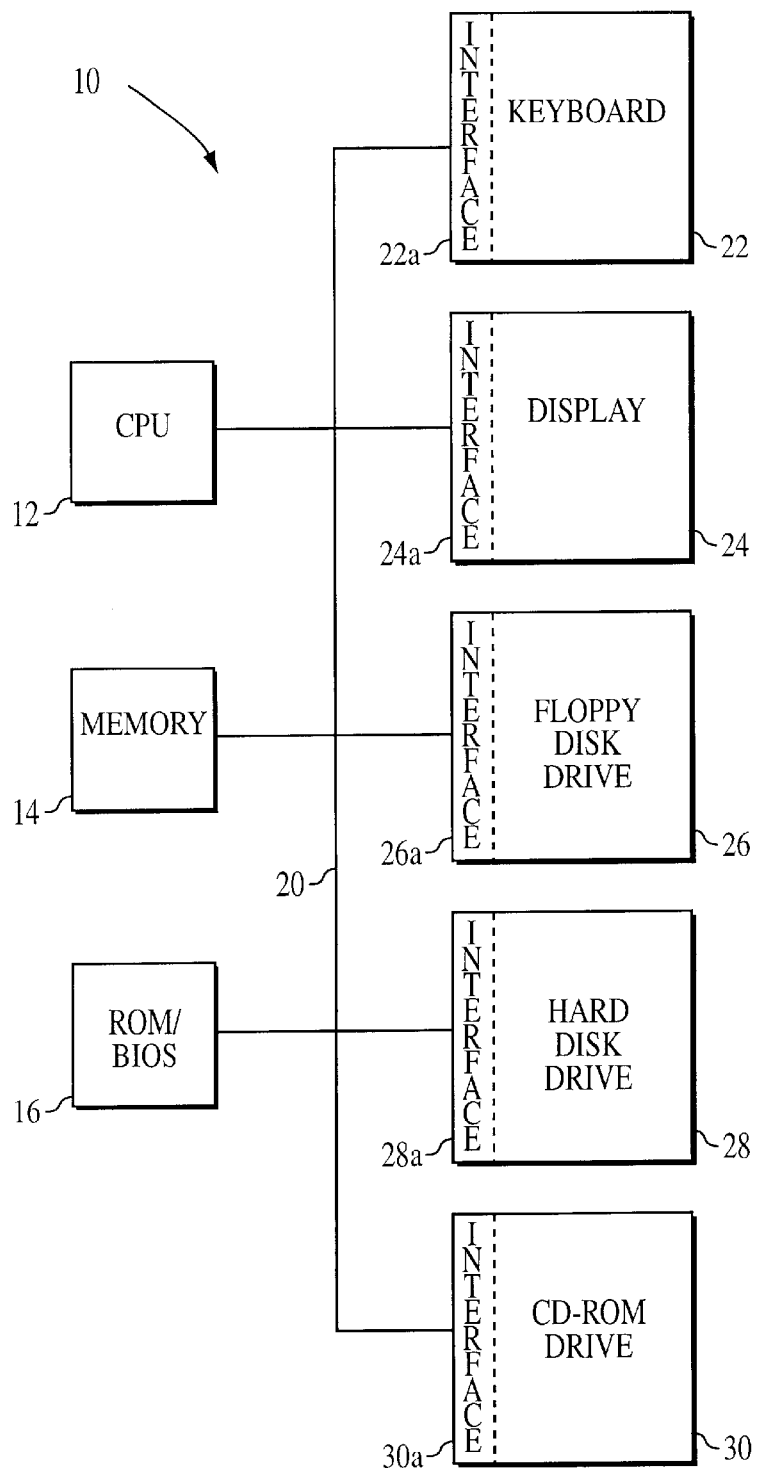
FIG. 1 illustrates a functional block diagram of a conventional computer system.

FIG. 1 illustrates a functional block diagram of a conventional computer system 10. The system 10 includes a central processing unit (CPU) 12, such as an Intel Pentium® II microprocessor. The system 10 also includes memory 14, which may include random access memory (RAM), and read-only memory (ROM) 16. The ROM 16 is typically used by the computer system 10 when power is first applied to the computer system 10 or the system 10 is reset. The ROM 16 includes a basic input/output system (BIOS), which contains a set of instructions that initialize the CPU 12 and other components in the system 10.

The computer system 10 also includes a keyboard 22, keyboard interface 22a, display 24, display interface 24a, floppy disk drive 26, floppy disk drive interface 26a, hard disk drive 28, hard disk drive interface 28a, CD-ROM drive 30 and CD-ROM drive interface 30a. It should be appreciated that some of the devices within the computer system 10 can share a common interface board. For example, the floppy disk drive 26 and the hard disk drive 28 are often controlled by a single interface.

The aforementioned components in the computer system 10 are coupled together by a bus system 20, which may carry power and control signals in addition to data. The bus system 20 may consist of a single bus or several busses interconnected by a bus bridge. For brevity and convenience purposes only, however, the bus system 20 is illustrated in FIG. 1 as a single bus. In addition, and also for brevity and convenience purposes, conventional components such as the power supply and mouse, for example, are not shown in FIG. 1.

When the computer system 10 is powered up or reset, the instructions in the ROM/BIOS 16 are executed by the CPU 12. The ROM/BIOS 16 contains instructions for the CPU 12 to perform basic functions such as setting internal CPU 12 registers to predetermined values. The ROM/BIOS 16 also causes the CPU 12 to perform basic operations for peripheral devices such as the keyboard 22 and the display 24, by setting internal registers of the keyboard and display interfaces 22a, 24a to predetermined values. The ROM/BIOS 16 typically includes instructions for setting internal registers of the floppy and hard disk drive interfaces 26a, 28a to permit proper operation of the floppy and hard disk drives 26, 28.

The ROM/BIOS 16 provides instructions for basic input/output (I/O) operations. Once the CPU 12 has completed execution of the BIOS instructions, the computer system 10 can start the operating system, such as Microsoft DOS® (hereinafter referred to as "MSDOS") or Microsoft WINDOWS® 95. The typical computer system 10 checks the floppy disk drive 26 for a bootable operating system. A bootable operating system is one that contains all the necessary files to start the operating system. For example, MSDOS includes three files called "IO.SYS," "MSDOS.SYS" and "COMMAND.COM." Instructions within the ROM/BIOS 16 transfer control of the computer system 10 to the file IO.SYS, which further initializes the computer system 10 as is known in the art. The IO.SYS file completes its initialization and loads the file MSDOS.SYS. The file MSDOS.SYS also functions in a well known manner and is responsible for loading the COMMAND.COM file, which is a user interface for the MSDOS.SYS file. The operation of these files are well known to those of ordinary skill in the art and need not be described in detail.

Of particular importance to the present invention is the configuration of certain I/O devices, such as the CD-ROM drive 30. The CPU 12 sequentially executes the program instructions contained within a "CONFIG.SYS" file to load the software drivers for the CD-ROM 30, for example, into the memory 14. The CONFIG.SYS file may reside on the hard disk drive 28 (when the computer system 10 has been completely assembled and configured) or on the bootable floppy disk (as described above). The loading of the software drivers into the computer's memory 14 effectuates the configuration of the peripheral devices and thus, the overall configuration of the computer system 10. That is, loading the correct CD-ROM driver into the memory 14, for example, configures the computer system 10 to properly access and communicate with the CD-ROM interface 30a and the CD-ROM drive 30

Corruption of any of the IO.SYS, MSDOS.SYS or CONFIG.SYS files renders it impossible for the CPU 12 to execute the instructions required to properly configure the computer system 10 and start MSDOS. Similarly, operating systems such as Microsoft WINDOWS® 95, which have the ability to identify CD-ROM drives and other peripheral devices if booted without errors, cannot be started if there is an error in one of its required startup files, such as CONFIG.SYS. Thus, the identification and configuration of interfaces cannot occur until the source of the error is determined and the corrupted file repaired or replaced. Unfortunately, the user often does not know the source of the problem. Furthermore, the typical user is unfamiliar with the computer hardware and software and is ill-prepared to load the proper drivers and to properly configure the computer system 10.

Figure 2A:
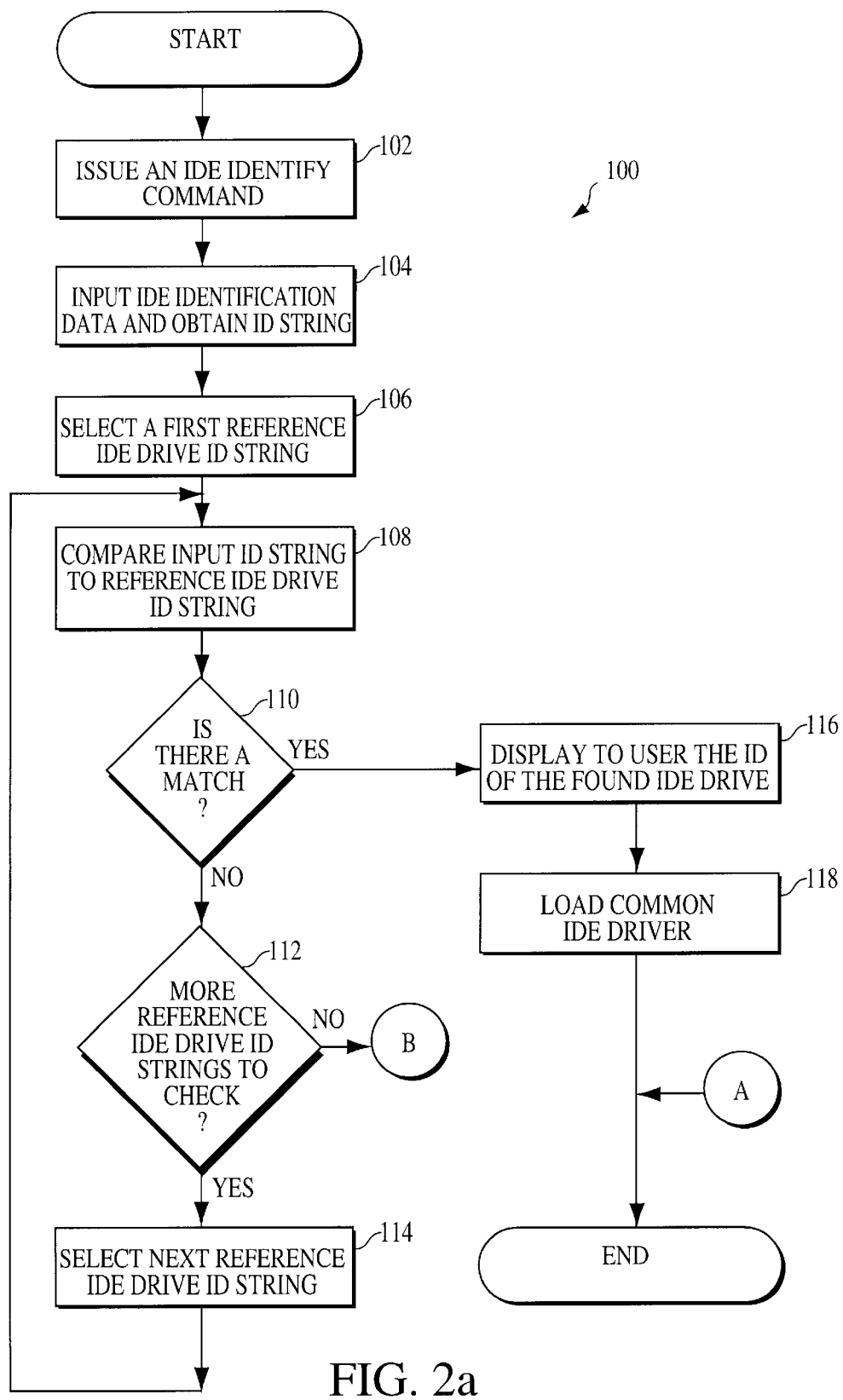
FIGS. 2a and 2b illustrate an exemplary process for identifying and configuring computer peripherals in accordance with the present invention.
Figure 2B:
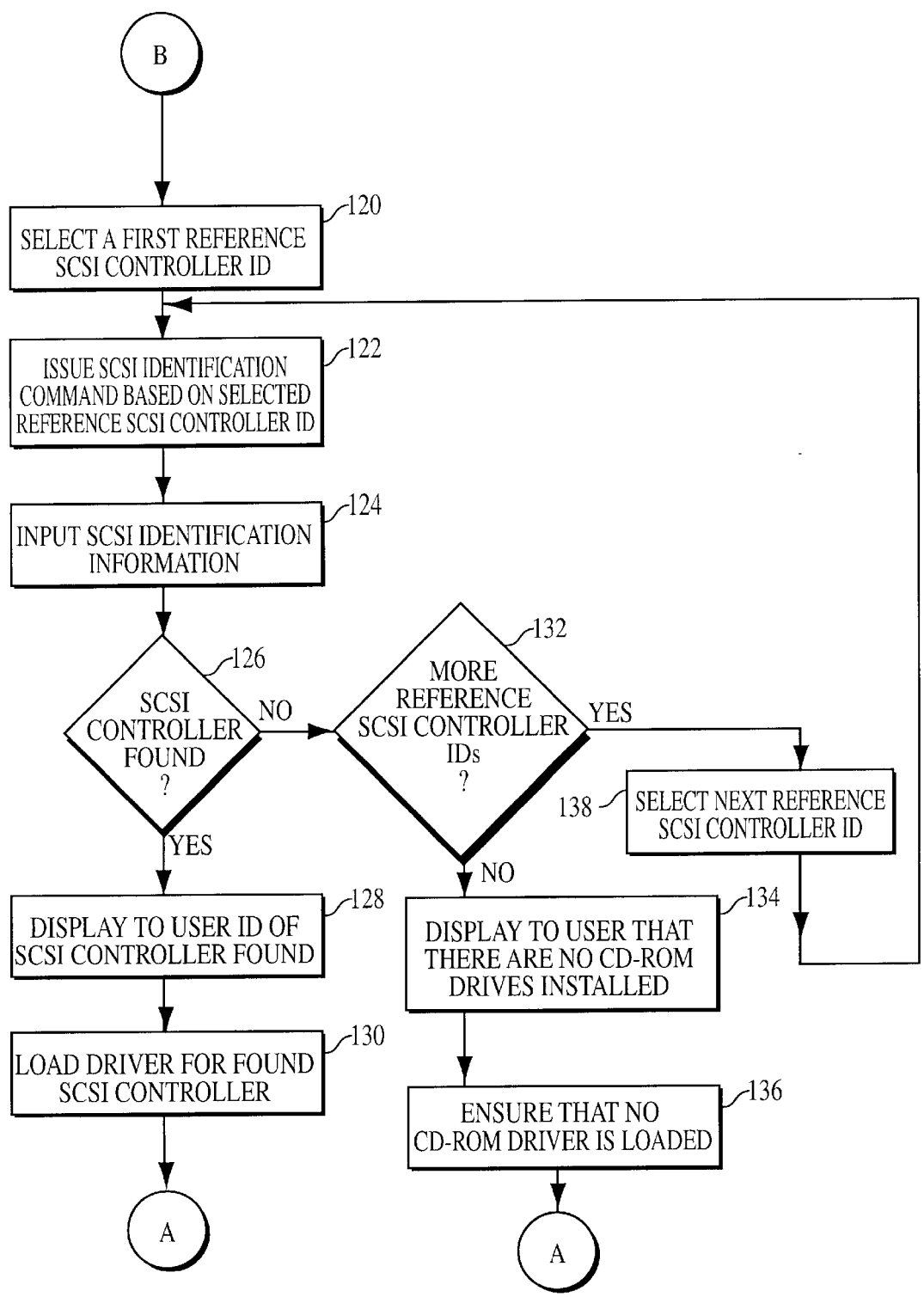

FIGS. 2a and 2b illustrate an exemplary process 100 for identifying and configuring computer peripherals in accordance with the present invention. The process 100 is implemented in software. The software instructions and any data necessary to carry out the process 100 will be stored on a floppy disk which can be inserted into the floppy disk drive 26 illustrated in FIG. 1. It is desirable that the floppy disk containing the process 100 will also be formatted to be a bootable disk. That is, the floppy disk will contain a bootable operating system, as described above with reference to FIG. 1. The floppy disk will contain the necessary startup files, such as, for example, the CONFIG.SYS file. When the bootable floppy disk containing the process 100 is inserted into a floppy disk drive of a computer system and the computer system is powered on or reset, the computer BIOS will cause the operating system to execute from the floppy disk. Once the operating system is up and running, the process 100 will execute. The formatting of a floppy disk into a boot disk is well known and does not require additional description.

Referring to FIGS. 2a and 2b, initially, the process 100 issues an IDE identify command over the computer bus to request an IDE CD-ROM drive, if one is installed, to identify itself (102). The IDE identify command is designed to identify the make and model of a CD-ROM drive coupled to an IDE CD-ROM interface. As generally known in the art, for the IDE type CD-ROM drive interface, the IDE identify command is an "Attention Application Programming Interface" (ATAPI) device identify instruction. The IDE identify instruction (i.e., the ATAPI device ID instruction) is transmitted to the CD-ROM drive via the CD-ROM drive interface (if an IDE CD-ROM drive is installed in the computer system). In response, and if an IDE CD-ROM drive is installed, the CD-ROM drive returns a sequence of IDE identification data bytes. This sequence of data bytes includes the IDE identification string (hereinafter the "ID string") that includes a vendor identification number and model number for the CD-ROM drive.

At 104, the IDE identification data is input and the ID string is obtained from the data. It is desirable that the process 100 wait a few seconds to allow the CD-ROM drive, if installed, to respond to the IDE identify command. The IDE identification data will be located at a predetermined memory location of the computer system and thus, the data and ID string can be easily obtained. It is desired that the predetermined memory location be initialized to values that do not correspond to any valid IDE type ID string. This way, if there is no response to the IDE identify command, the IDE identification data will not contain a valid IDE ID string. Therefore, if there is no IDE type CD-ROM drive in the system, and thus, no response to the IDE identify command is received, an ID string that does not correspond to any of the known IDE type ID strings will be obtained from the identification data and easily detected by the process 100. At 106, a first known reference IDE drive string is selected from a list of all known IDE CD-ROM ID strings. It is desirable for the list of reference IDE drive strings can be contained in a table and stored along with the program instructions required to implement the process 100.

At 108, the reference IDE drive ID string is compared to the input ID string. At 110, it is determined if the two strings match. If it is determined that the reference IDE drive string matches the input ID string, an IDE CD-ROM drive has been found and the process 100 continues at 116. At 116, the identity (i.e., the type, make and model) of the found IDE CD-ROM drive is displayed over the display 24 (FIG. 1) to the user operating the computer system. The user may wish to take down this information for future reference.

At 118, a "common" driver allowing any IDE CD-ROM interface to communicate with the CPU is loaded into the appropriate location of the computer system memory. This single common IDE CD-ROM driver replaces the numerous individual drivers required by the numerous individual IDE CD-ROM drive makes and models. One such common driver is currently available from Oak Technologies. To load the driver into memory, the process 100 (at 118) modifies the instructions contained within the CONFIG.SYS file that have been loaded into memory, but not yet executed by the CPU, so that it contains the information required to locate and load the common driver when the CPU executes the CONFIG.SYS instructions. One way to accomplish this would be to have the instructions required to load the common driver and any SCSI drivers already within the CONFIG.SYS file. Once the instructions are loaded into the computer system memory, all that is required to modify these instructions to load the common driver (at 118) would be to "remark" out the instructions relating to the SCSI drivers. As known in the art, the CPU will not execute an instruction that has been remarked. Once the CPU executes the CONFIG.SYS instructions, the common driver will be loaded and the IDE CD-ROM drive will be accessible by the CPU.

If at 110 it is determined that the reference IDE drive string does not match the input ID string, there is either no IDE CD-ROM drive installed or if installed, has not been properly identified. At this point, the process 100 continues at 112 where it is determined if there are more reference IDE drive ID strings to compare with the input ID string. If at 112 it is determined that there are more reference IDE drive ID strings to check, the process 100 continues at 112 where the next reference IDE drive ID string is selected from the list of all known IDE CD-ROM ID strings. The process 100 continues at 108 to compare the input ID string to the new reference IDE drive ID string.

If at 112 it is determined that there are no more reference IDE drive ID strings to check, then the computer system does not have an IDE CD-ROM drive installed and the process 100 continues at 120 (to determine if there is a SCSI type CD-ROM drive installed in the computer system). Unlike the IDE type CD-ROM drive interfaces, the SCSI type CD-ROM interface is unique to each manufacturer. Typically, however, each manufacturer will use a single SCSI interface and software driver to operate all of the manufacturer's SCSI type CD-ROM drives. Thus, the process 100 need only determine the make of the SCSI interface and not the make and model of the SCSI type CD-ROM drive itself. To do so, the process 100 must be equipped to communicate with the various SCSI type interfaces which are generally known in the art as "SCSI controllers." Therefore, it is desirable for the process 100 to include a list of all known SCSI controller IDs and the appropriate instruction for initiating a SCSI identification command to each controller. It is desirable for the list of SCSI controller IDs and their associated identification commands to be contained in a table and stored along with the program instructions required to implement the process 100. As is known in the art, there are relatively few SCSI controller manufactures and thus, few SCSI controller drivers. Therefore, all of the SCSI controller drivers can reside on the same bootable floppy disk that contains the process 100 and the common IDE driver file.

At 120, a first reference SCSI controller ID is selected from the list of known SCSI controller IDs. The SCSI identification command that is unique to the first reference SCSI controller is also obtained from the list. At 122, the SCSI identification command is issued and transmitted to the SCSI controller (if a SCSI controller and SCSI type CD-ROM drive is installed in the computer system) over the computer bus. In response, and if a SCSI controller and SCSI type CD-ROM driver that matches the reference SCSI controller ID is installed, the SCSI controller returns a predetermined sequence of SCSI identification data bytes. This sequence of data bytes includes the SCSI controller ID string that includes a vendor identification number and model number for the SCSI controller (not the drive).

At 124, the SCSI identification data is input and the SCSI ID string is obtained from the data. It is desirable that the process 100 wait a few seconds to allow the SCSI controller, if installed, to respond to the SCSI identification command. The SCSI identification data will be located at a predetermined memory location of the computer system and thus, the data and ID string can be easily obtained. It is desired that the predetermined memory location be initialized to values that do not correspond to any valid SCSI controller ID. This way, if there is no response to the SCSI identification command, the SCSI identification data will not contain a valid SCSI controller ID. Therefore, if there is no SCSI controller installed, or a SCSI controller that does not match the reference SCSI controller ID is installed, no response to the SCSI identify command is received and an ID string that does not correspond to any SCSI controller will be obtained from the SCSI identification data which can be easily detected by the process 100.

At 126, it is determined if a SCSI controller that matches the reference SCSI controller ID was found. If it is determined that a SCSI controller matching the reference SCSI controller ID was found, the process 100 continues at 128. At 128, the identity (i.e., the type and make) of the found SCSI controller is displayed over the display 24 (FIG. 1) to the user operating the computer system. The user may wish to take down this information for future reference.

At 130, a driver unique to the found SCSI controller is loaded into the appropriate location of the computer system memory. To load the driver into memory, the process 100 (at 130) modifies the instructions contained within the CONFIG.SYS file that have been loaded into memory, but not yet executed by the CPU, so that it contains the information required to locate and load the unique driver associated with the found SCSI controller when the CPU executes the CONFIG.SYS instructions. As described above with reference to 118, one way to accomplish this would be to have the instructions required to load the common IDE driver and all of the known SCSI drivers within the CONFIG.SYS file. Once the instructions are loaded into the computer system memory, all that is required to modify these instructions to load the correct SCSI controller driver (at 130) would be to "remark" out the instructions relating to the common IDE driver and the SCSI controller drivers that are not unique to the found SCSI controller. As known in the art, the CPU will not execute an instruction that has been remarked. Once the CPU executes the CONFIG.SYS instructions, the correct SCSI controller driver will be loaded and the SCSI type CD-ROM drive will be accessible by the CPU.

If at 126 it is determined that a SCSI controller matching the reference SCSI controller ID was not found, there is either no SCSI controller installed or if one is installed it has not been properly identified. At this point, the process 100 continues at 132 where it is determined if there are more reference SCSI controller IDs to check. If at 132 it is determined that there are more reference SCSI controller IDs to check, the process 100 continues at 138 where the next reference SCSI controller ID is selected from the list of known SCSI controller IDs. The SCSI identification command that is unique to this reference SCSI controller ID is also obtained from the list. The process 100 continues at 122 where the SCSI identification command is issued (in an attempt to find a SCSI controller having an ID that matches the reference SCSI controller ID).

If at 132 it is determined that there are no more reference SCSI controller IDs to check, then the computer system does not have a SCSI controller and thus, does not have a SCSI type CD-ROM drive installed and the process 100 continues at 134 where a message indicating that a CD-ROM was not found in the system is displayed over the display 24 (FIG. 1) to the user operating the computer system. At this point, there are no IDE type or SCSI type CD-ROM drives installed in the system and thus, at 136, all of the drivers are remarked out of the CONFIG.SYS file (as described above with reference to 118 and 130) to ensure that no driver is loaded into the memory of the computer.

As indicated earlier, the process 100 of the present invention can be executed when the CD-ROM drive has been installed by a technician assembling the computer system. Moreover, the process 100 can be executed by a user who is reinstalling the CD-ROM drive or the computer operating system in response to a software malfunction or as part of a system upgrade. The present invention provides the technician and user with the ability to automatically, and without their intervention, identify and configure peripheral devices, such as a CD-ROM drive. Since a common IDE driver is being used, the process 100 and all of the drivers necessary to configure any IDE and SCSI type CD-ROM drives can reside on a single bootable floppy disk, which further simplifies the installation and reinstallation procedures.

It should be appreciated that the software instructions required to implement the method of the present invention can reside on a mainframe or server computer. The instructions can then be downloaded into the computer system over the computer bus and the CPU can execute the instructions implementing the method of the present invention to configure the computer system to load the proper driver for an installed CD-ROM drive.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A computer implemented method of automatically identifying and configuring a computer peripheral device, comprising:

initiating an identification command associated with a first type of computer peripheral device to the computer peripheral device;

determining if the computer peripheral device is of the first type by:

inputting peripheral identity information corresponding to an identity of the computer peripheral; and comparing the input peripheral identity information to at least one reference identity information associated with the first type of computer peripheral to see if there is a match; and if the computer peripheral device is of the first type, loading a driver common to all computer peripheral devices of the first type into the memory of the computer.

2. The method of claim 1, wherein said first type of computer peripheral device is an integrated device electronics (IDE) device.

3. The method of claim 1 wherein the input peripheral identity information is compared to a plurality of reference identity information associated with the first type of computer peripheral to see if the computer peripheral is of the first type.

4. The method of claim 1 wherein said loading act comprises:

loading configuration instructions into the computer memory; and modifying the configuration instructions to allow the computer to execute the driver common to all computer peripheral devices of the first type.

5. The method of claim 4 wherein the configuration instructions include instructions allowing the computer to execute a plurality of drivers for the computer peripheral and the act of modifying the instructions is performed by removing the instructions that do not correspond to the driver common to all computer peripherals of the first type.

6. The method of claim 1 further comprising:
if the computer peripheral device is not of the first type:
   initiating a identification command associated with a model of a second type of computer peripheral device to the computer peripheral device
   determining if the computer peripheral device is of the second type; and
if the computer peripheral device is of the second type, loading a driver associated with the model of the second type of computer peripheral device into the memory of the computer.

7. The method of claim 6 wherein said second type of computer peripheral device is a small computer system interface (SCSI) device.

8. The method of claim 6 wherein said act of determining if the computer peripheral device is of the second type comprises:
inputting peripheral identity information corresponding to an identity of the computer peripheral; and
comparing the input peripheral identity information to at least one reference identity information associated with a model of the second type of computer peripheral to see if there is a match.

9. The method of claim 6 wherein said act of loading a driver associated with the model of the second type of computer peripheral device comprises:
loading configuration instructions into the computer memory; and
modifying the configuration instructions to allow the computer to execute the driver associated with the model of the second type of computer peripheral device.

10. The method of claim 9 wherein the configuration instructions include instructions allowing the computer to execute a plurality of drivers for the computer peripheral and the act of modifying the instructions is performed by removing the instructions that do not correspond to the driver associated with the model of the second type of computer peripheral device.

11. The method of claim 1 wherein said peripheral device is a compact disk read-only memory (CD-ROM) device.

12. The method of claim 1 further comprising the act of displaying the identity of the peripheral device.

13. A computer readable storage medium containing a computer readable code for operating a computer to perform a method of automatically identifying and configuring a computer peripheral device, said computer-readable storage medium further including a plurality of drivers for operation of a plurality of peripheral devices, said method comprising:
initiating an identification command associated with a first type of computer peripheral device to the computer peripheral device;
determining if the computer peripheral device is of the first type by:
   inputting peripheral identity information corresponding to an identity of the computer peripheral; and
   comparing the input peripheral identity information to at least one reference identity information associated with the first type of computer peripheral to see if there is a match; and
if the computer peripheral device is of the first type, loading a driver common to all computer peripheral devices of the first type into the memory of the computer.

14. The computer readable storage medium of claim 13, wherein said first type of computer peripheral device is an integrated device electronics (IDE) device.

15. The computer readable storage medium of claim 13 wherein the input peripheral identity information is compared to a plurality of reference identity information associated with a first type of computer peripheral to see if the computer peripheral is a first type of computer peripheral.

16. The computer readable storage medium of claim 13 wherein said loading act of said method comprises:
loading configuration instructions into the computer memory; and
modifying the configuration instructions to allow the computer to execute the driver common to all computer peripheral devices of the first type.

17. The computer readable storage medium of claim 16 wherein the configuration instructions include instructions allowing the computer to execute a plurality of drivers for the computer peripheral and the act of modifying the instructions is performed by removing the instructions that do not correspond to the driver common to all computer peripherals of the first type.

18. The computer readable storage medium of claim 13 wherein said method further comprises:
if the computer peripheral device is not of the first type:
   initiating an identification command associated with a model of a second type of computer peripheral device to the computer peripheral device;
   determining if the computer peripheral device is of the second type of computer peripheral device; and
if the computer peripheral device is of the second type, loading a driver associated with said model of the second type of computer peripheral device into the memory of the computer.

19. The computer readable storage medium of claim 18 wherein said second type of computer peripheral device is a small computer system interface (SCSI) device.

20. The computer readable storage medium of claim 18 wherein said method act of determining if the computer peripheral device is of tine second type comprises:
inputting peripheral identity information corresponding to an identity of the computer peripheral; and
comparing the input peripheral identity information to at least one reference identity information associated with a model of a second type of computer peripheral to see if there is a match.

21. The computer readable storage medium of claim 20 wherein said method act of loading a driver associated with said model of the second type of computer peripheral device comprises:
loading configuration instructions into the computer memory; and
modifying the configuration instructions to allow the computer to execute the driver associated with said model of the second type of computer peripheral device.

22. The computer readable storage medium of claim 21 wherein the configuration instructions include instructions allowing the computer to execute a plurality of drivers for the computer peripheral and the act of modifying the instructions is performed by removing the instructions that do not correspond to the driver associated with said model of the second type of computer peripheral device.

23. The computer readable storage medium of claim 13 wherein said computer readable medium is a bootable floppy disk.

24. The computer readable storage medium of claim 13 wherein said peripheral device is a compact disk read-only memory (CD-ROM) device.

25. The computer readable storage medium of claim 13 further comprising the act of displaying the identity of the computer peripheral device.

26. A system for the automatic identification and configuration of a peripheral device connected to said system, said system comprising:
   a memory circuit;
   a computer readable storage medium containing program instructions for execution by a processor to automatically identify and configure a peripheral device of said system, said computer readable medium further containing a plurality of drivers for operation of a plurality of peripheral devices;
   an interface device for interfacing said computer readable medium with a processor; and
   a processor connected to said memory circuit and said interface device, said processor executing said program instructions stored on said computer-readable medium to:
      initiate an identification command associated with a first type of computer peripheral device to the computer peripheral device;
      determine if the computer peripheral device is of said first type of computer peripheral device by:
         inputting peripheral identity information corresponding to an identity of the computer peripheral; and
         comparing the input peripheral identity information to at least one reference identity information associated with said first type of computer peripheral to see if there is a match; and
      if the computer peripheral device is of the said type, loading a driver common to all computer peripheral devices of said first type into said memory circuit.

27. The system of claim 26, wherein said first type of computer peripheral device is an integrated device electronics (IDE) device.

28. The system of claim 26 wherein the input peripheral identity information is compared to a plurality of reference identity information associated with said first type of computer peripheral to see if the computer peripheral is said first type of computer peripheral.

29. The system of claim 26 wherein said processor loads said driver common to all computer peripheral devices of said first type by:
   loading configuration instructions into said memory circuit; and
   modifying the configuration instructions to allow said processor to execute said driver common to all computer peripheral devices of said first type.

30. The system of claim 29 wherein said configuration instructions include instructions allowing the processor to execute a plurality of drivers for the computer peripheral and said processor modifies said instructions by removing instructions that do not correspond to said driver common to all computer peripherals of said first type.

31. The system of claim 26 wherein said processor further:
   if the computer peripheral device is not of said first type:
      initiates an identification command associated with a model of a second type of computer peripheral device to the computer peripheral device;
      determines if the computer peripheral device is of said second type of computer peripheral device; and
   if the computer peripheral device is of said second type, loads a driver associated with said model of said second type of computer peripheral device into said memory circuit.

32. The system of claim 31 wherein said second type of computer peripheral device is a small computer system interface (SCSI) device.

33. The system of claim 31 wherein said processor determines if the computer peripheral device is of said second type by:
   inputting peripheral identity information corresponding to an identity of the computer peripheral; and
   comparing said input peripheral identity information to at least one reference identity information associated with a model of said second type of computer peripheral to see if there is a match.

34. The system of claim 33 wherein said processor loads said driver associated with said model of said second type by:
   loading configuration instructions into said memory circuit; and
   modifying said configuration instructions to allow said processor to execute said driver associated with said model of said second type of computer peripheral device.

35. The system of claim 34 wherein said configuration instructions include instructions allowing said processor to execute said plurality of drivers stored on said computer readable storage medium and said processor modifies said instructions by removing instructions that do not correspond to said driver associated with said model of said second type of computer peripheral device.

36. The system of claim 26 wherein said computer readable storage medium is a bootable floppy disk and said interface device is a floppy disk drive.

37. The system of claim 26 wherein said peripheral device is a compact disk read-only memory (CD-ROM) device in communication with said processor.

38. The system of claim 26 further comprising a display device, wherein said processor displays said identity of the computer peripheral device on said display device.

39. A computer program transmitted from a server computer to a computer system, said computer system comprising memory, a peripheral device and a processor in communication with said memory and peripheral device, said computer program causing said processor to perform the acts of:
   initiating an identification command associated with a first type of computer peripheral device to the computer peripheral device;
   determining if the computer peripheral device is of the first type by:
      inputting peripheral identity information corresponding to an identity of the computer peripheral; an
      comparing the input peripheral identity information to at least one reference identity information associated with the first type of computer peripheral to see if there is a match; and
   if the computer peripheral device is of the first type, loading a driver common to all computer peripheral devices of the first type into the memory of the computer.

40. A computer program transmitted from a server computer to a computer system, said computer system comprising memory, a peripheral device and a processor in communication with said memory and peripheral device, said computer program causing said processor to perform the acts of:
   initiating an identification command associated with a first type of computer peripheral device to the computer peripheral device;

determining if the computer peripheral device is of the first type by:
  inputting peripheral identity information corresponding to an identity of the computer peripheral; and
  comparing the input peripheral identity information to at least one reference identity information associated with the first type of computer peripheral to see if there is a match; and
if the computer peripheral device is of the first type, loading a driver common to all computer peripheral devices of the first type into the memory of the computer; or
if said computer peripheral device is not of said first type, initiating an identification command associated with a model of a second type of computer peripheral device to said computer peripheral device; determining if said computer peripheral device is of said second type, and if said computer peripheral device is of said second type, loading a driver associated with said model of said second type of computer peripheral device into said memory.

41. A computer program transmitted over a communication medium to a computer system, said computer system comprising memory, a CD-ROM device and a processor in communication with said memory and CD-ROM device, said computer program causing said processor to perform the acts of:
  initiating an identification command associated with a first type of CD-ROM device to said CD-ROM device;
  determining if said CD-ROM device is of said first type by:
    inputting CD-ROM device identity information corresponding to an identity of the CD-ROM device; and
    comparing the input CD-ROM device identity information to at least one reference identity information associated with the first type of CD-ROM device to see if there is a match; and
  if said CD-ROM device is of said first type, loading a driver common to all CD-ROM devices of said first type into said memory; or
  if said CD-ROM device is not of said first type, initiating an identification command associated with a model of a second type of CD-ROM device to said CD-ROM device; determining if said CD-ROM device is of said second type, and if said CD-ROM device is of said second type, loading a driver associated with said model of said second type of CD-ROM device into said memory.

42. A computer implemented method for automatically identifying and configuring a CD-ROM drive, comprising:
  initiating an identification command associated with an IDE-type CD-ROM drive to the CD-ROM drive;
  determining if the CD-ROM drive is an IDE-type CD-ROM drive by:
    inputting IDE-type CD-ROM device identity information corresponding to an identity of the CD-ROM device; and
    comparing the input IDE-type CD-ROM device identity information to at least one reference identity information associated with the IDE-type of CD-ROM device to see if there is a match; and
  if the CD-ROM drive is an IDE-type CD-ROM drive, loading a driver common to all IDE-type CD-ROM drives into a memory of the computer;
  if the CD-ROM drive is not an IDE-type CD-ROM drive, initiating a SCSI identification command corresponding to a selected reference SCSI controller identification;
  determining if the CD-ROM drive is a SCSI-type CD-ROM drive corresponding to the selected reference SCSI controller identification;
  if the CD-ROM drive is not a SCSI-type CD-ROM corresponding to the selected reference SCSI controller identification, issuing a SCSI identification command corresponding to a different selected reference SCSI controller identification and repeating until either the SCSI controller identification is determined or it is determined that the CD-ROM drive is not a SCSI-type CD-ROM drive;
  if the SCSI controller identification is determined, loading into the memory of the computer a driver corresponding to the determined SCSI controller identification; and
  if it is determined that the CD-ROM drive is neither an IDE-type CD-ROM drive nor a SCSI-type CD-ROM drive, providing an indication to a user that no CD-ROM driver is loaded.

* * * * *